United States Patent [19]

Taylor

[11] 4,039,306

[45] Aug. 2, 1977

[54] ADSORBER APPARATUS

[76] Inventor: John C. Taylor, 16 Cinnamon Lane, Portuguese Bend, Calif. 90274

[21] Appl. No.: 512,510

[22] Filed: Oct. 7, 1974

Related U.S. Application Data

[63] Continuation-in-part of Ser. No. 320,208, Jan. 2, 1973, Pat. No. 3,876,397.

[51] Int. Cl.² .............................................. B01D 53/04
[52] U.S. Cl. ......................................... 55/163; 55/88; 55/179
[58] Field of Search ....................... 55/21, 58, 88, 163, 55/179, 387–389; 210/284

[56] References Cited

U.S. PATENT DOCUMENTS

| | | | |
|---|---|---|---|
| 2,334,802 | 11/1943 | Zuckermann | 210/284 X |
| 2,413,771 | 1/1947 | Luaces | 55/387 X |
| 3,217,465 | 11/1965 | Fontaine et al. | 55/163 X |
| 3,338,032 | 8/1967 | Siewert | 55/387 X |
| 3,448,561 | 6/1969 | Seibert et al. | 55/163 X |
| 3,519,398 | 7/1970 | Roberts | 55/163 X |
| 3,540,188 | 11/1970 | Barrere, Jr. et al. | 55/163 X |
| 3,552,096 | 1/1971 | Dayson | 55/163 |
| 3,581,782 | 6/1971 | Onufer | 55/387 X |
| 3,853,507 | 12/1974 | Monroe et al. | 55/387 X |
| 3,876,397 | 4/1975 | Taylor | 55/163 |

*Primary Examiner*—Thomas G. Wyse
*Assistant Examiner*—Robert H. Spitzer
*Attorney, Agent, or Firm*—Fulwider, Patton, Rieber, Lee & Utecht

[57] ABSTRACT

A self-stripping, recycling adsorbing unit for recovery of hydrocarbons from a mixture of hydrocarbon vapors and air, including two adsorbers filled with adsorbent material, automatically controlled valves which route the mixed vapor flow through one adsorber and connect the other to a stripping apparatus, and instrumentation which automatically determines when the flows through the adsorbers should be interchanged and which activates the automatic valves to accomplish this interchange. The stripping apparatus includes a compressor with suction arranged to alternately evacuate the adsorbers and with its discharge connected to a condenser. Condensed hydrocarbon is sent to storage and uncondensed vapors are recycled through the active adsorber together with mixed air and hydrocarbon vapors entering the system for processing.

An alternative means of stripping the adsorbers utilizes the compressor, condenser and related equipment from an existing vapor recovery system to which the adsorbers may be connected for stripping. Modifications to the existing system include instrumention to provide for and restrict the use of existing components for stripping the adsorbers to time intervals when such components are otherwise inactive.

In further embodiments, the compressor output is periodically routed through selected adsorbers, heating the adsorber selected for regeneration whereby the adsorber is warmed up to induce evaporation of the hydrocarbon collected therein.

7 Claims, 9 Drawing Figures

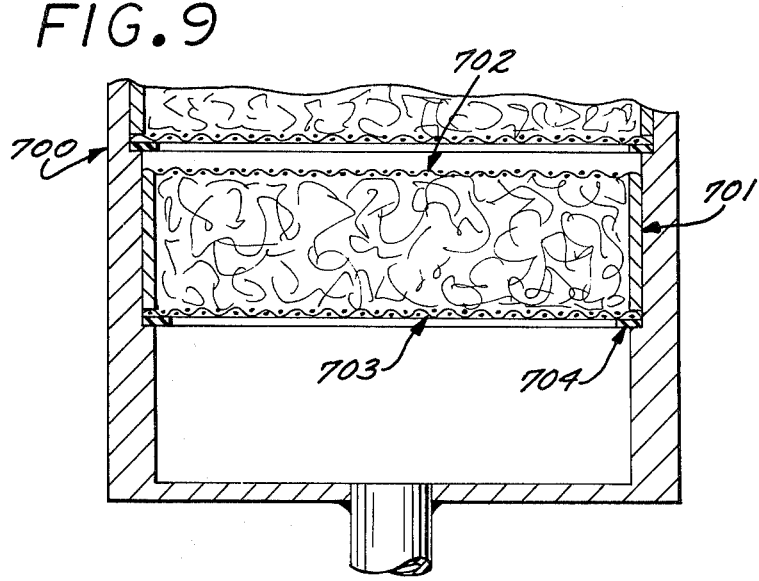
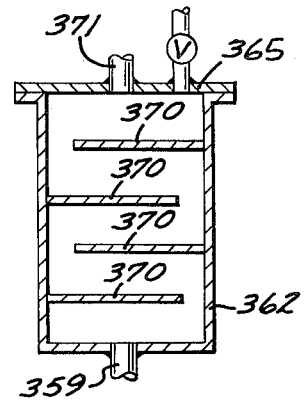
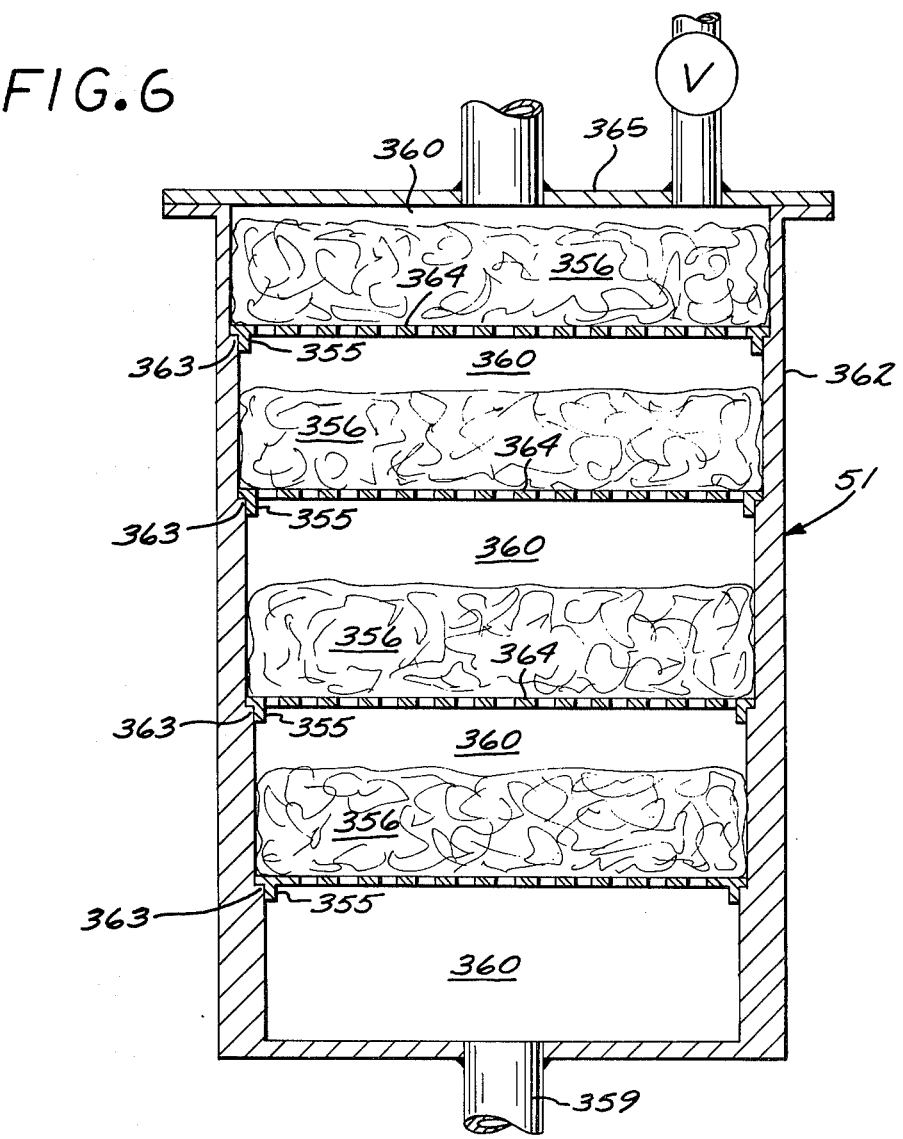

ADSORBER APPARATUS

CROSS-REFERENCE TO RELATED APPLICATION

The present application is a continuation-in-part of my copending application, Ser. No. 320,208, filed Jan. 2, 1973, now U.S. Pat. No. 3,876,397 for ADSORBING APPARATUS. The benefit of the earlier filing date is claimed for the subject matter common to both applications.

BACKGROUND OF THE INVENTION

1. Field of the Invention

The adsorbing apparatus of the present invention relates to an apparatus for recovering hydrocarbons from vapors collected during the operation of vehicle fueling facilities, such as automobile service stations, boat fuel depots, etc.

2. Description of the Prior Art

Anti-pollution legislation, present and pending, requires the prevention of hydrocarbon emissions from automobile fuel tanks and service station tanks during fueling operations. Several methods have been proposed for preventing such emissions, but such proposals are undesirable from the consideration of high cost or poor performance.

SUMMARY OF THE INVENTION

One method of recovering hydrocarbons from vapors is to pass the vapors through an adsorbent material, such as activated charcoal, which will let air pass through but which will condense and collect hydrocarbons on its surface. Practically all of the hydrocarbons would thus be collected and remaining would then be the problem of collection and disposal of the hydrocarbons from the saturated adsorbent, or the alternate replacement of the saturated adsorbent with unsaturated material.

The adsorber apparatus of the present invention includes two adsorbers filled with activated charcoal or other suitable adsorbent material. Vapors collected from fueling operations are passed through one active adsorber wherein the hydrocarbons are adsorbed and the air is passed through the atmosphere. Concurrently, an inactive adsorber is evacuated by a vacuum pump or compressor, the evacuated vapors being compressed, chilled and condensed. Condensed hydrocarbon is then removed from the condenser by a float-operated valve and is returned to a storage tank. Uncondensed vapors leaving the condensed are separated from the condenser and are routed to join the inlet stream of collected vapors to be recycled through the active adsorber. This technique permits a lesser percentage of recovery in the condenser than would otherwise be required to provide the necessary overall recovery, thereby allowing for a lower operating pressure of the condenser, compressor and related equipment. A pressure controller senses reduced pressure in the evacuated adsorber and automatically controls valves which interchange the adsorber connections so that the vapors then flow through the newly evacuated adsorber and the other is connected to the compressor suction for evacuation. The apparatus thus provides a continuous adsorbing apparatus with automatic regeneration.

Another embodiment of this invention provides an adapter in combination with a service station vapor recovery apparatus, said adapter providing for the connection of an adsorbent filled container to said vapor recovery apparatus. When so connected, adsorbed hydrocarbons may be extracted from said container when the service station vapor recovery apparatus is otherwise inactive.

Yet a further embodiment of the present invention includes selective temporary routing of the compressor outlet to the inlet of the adsorber to be regenerated next whereby the high temperature outlet fluids of the compressor are initially passed through the adsorber, warming up the adsorber to aid in the evaporation rate of the hydrocarbons collected therein. This routing is maintained for a limited duration as controlled by a time delay relay, which after a predetermined time returns the compressor outlet to the condenser while closing the inlet to the adsorber being regenerated. In addition, external heating sources may be applied both to the input conductor and to the respective adsorbers in order to further raise the temperature thereof prior to and during regeneration.

An alternative embodiment of the present invention incorporating such preheating cycle includes modifications to the adsorbers to provide coils of a conduit disposed within the interior thereof each such heating conduit being similarly connected through selector valves between the output of the compressor and the input of the condenser. In this manner the compressor output fluids which are at a high temperature by virtue of the compression are selectively conveyed to the adsorber which is in the regeneration cycle, such heating flow raising the internal temperature of the adsorber to aid in the evaporation of the hydrocarbons collected therein.

Further detailed embodiments are shown illustrating various structural arrangements of a plurality of adsorbers and of the adsorber itself, such structural arrangements providing for more efficient utilization of the adsorber material and for a more effective conduction of heat to the interior thereof.

The objects and advantages of the present invention will become apparent from a consideration of the following description when taken in conjunction with the accompanying drawings.

BRIEF DESCRIPTION OF THE DRAWINGS

FIG. 6 is a side view, in partial cross-section, of an adsorber unit adapted for use with the embodiment shown in FIG. 4;

FIG. 7 is a side view, in partial cross-section, of yet another embodiment of an adsorber constructed according to the present invention;

FIG. 9 is a side view, in partial cross-section, of yet another embodiment of the inventive adsorber shown in FIG. 6.

DESCRIPTION OF THE PREFERRED EMBODIMENTS

Figure 1:
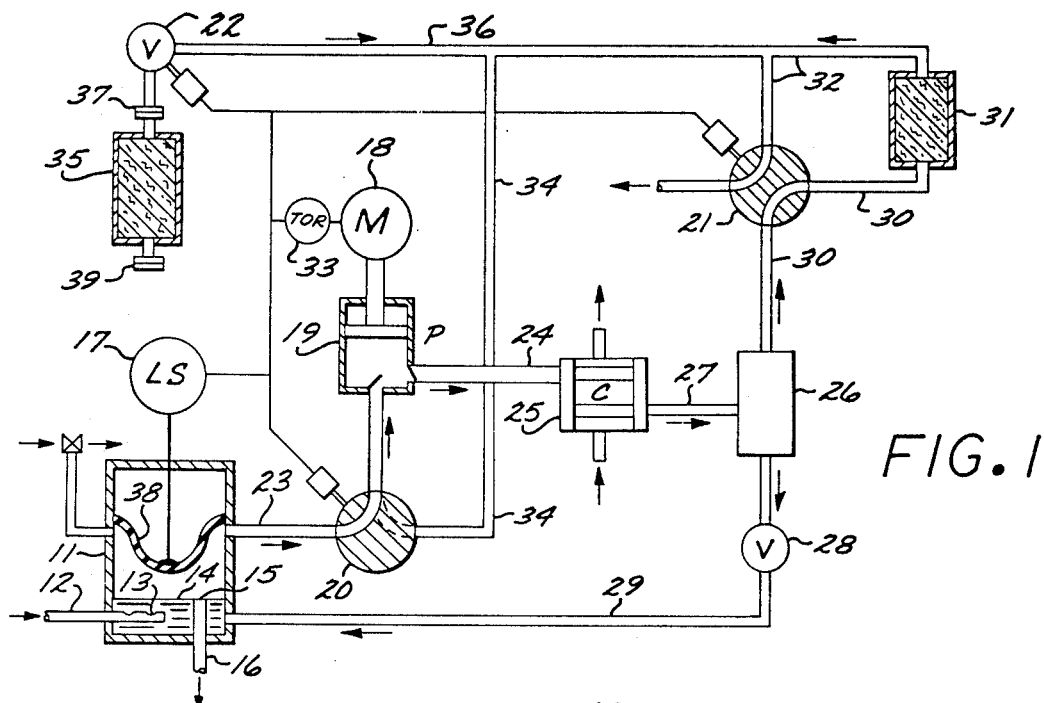
FIG. 1 is a diagrammatic view of a first embodiment of a service station vapor recovery unit constructed according to the present invention.

Referring to FIG. 1, a first embodiment shows vapors collected from vehicle fueling operations by apparatus (not shown) enter a variable volume surge tank 11 via an inlet conduit 12 having outlet ports 13 disposed in the surge tank at a level below the surface of liquid hydrocarbon 14. The level of hydrocarbon 14 is maintained at a constant level by overflow weir 15 forming liquid outlet 16 of surge tank 11, said outlet being connected to a liquid hydrocarbon storage (not shown).

A switch 17 senses the volume of vapors in surge tank 11 by means of its connection to a flexible diaphragm 38 therein closing a circuit at a predetermined level of expansion to start motor 18 of a conventional compressor 19. Switch 17 simultaneously energizes or de-energizes the solenoid operated valves 20, 21 and 22 to a position where the vapor flows from surge tank 11 via a conduit 23 across one solenoid operated valve 20 to compressor 19. Compressed vapors are discharged from compressor 19 via a conduit 24, entering a condensor 25 wherein the hydrocarbons are substantially condensed. Liquid condensate and uncondensed vapors flow from the condenser to a conventional vapor-liquid separator 26 via a conduit 27. A float operated liquid drain valve 28 permits a return of the liquid condensate via a conduit 29 from separator 26 to surge tank 11. Vapors leave vapor-liquid separator 26 via a conduit 30 across a four-way solenoid operated valve 21 switched to connect to an adsorber 31, which contains activated charcoal or other suitable adsorbent material permitting the passage of air but adsorbing hydrocarbons. Vapor leaving the adsorber 31 is routed through a conduit 32 across the four-way valve 21 which provides in this position a passage for venting thereof to the atmosphere. The solenoid operated valve 22 is closed during the foregoing operation.

When the operation of compressor 19 has reduced the gas volume in surge tank 11 to a predetermined low level, switch 17 reverses the position of the solenoid operated valves 20, 21 and 22 and activates a conventional time delay relay 33 in the control circuit of motor 18. Time delay relay 33 is set to keep the motor 18 and the compressor 19 running for a predetermined period of time after its activation during which, because of the reversal of the solenoid operated valves, the compressor 18 suction is connected to provide for evacuating the adsorber 31 via conduits 32 and 34. The compressor 18 may concurrently evacuate a second adsorber 35 connected to a conduit 36 by a connector 37, said conduit 36 containing the solenoid operated valve 22 which is now in the open position. During the evacuation operation, the inlet of the adsorber 35 is closed by a blind flange 39, or any other suitable device. Vapors discharged from the compressor during the evacuation operation are processed as before, except that the position of the solenoid operated valve 21 having been reversed, vapors leaving the separator 26 are vented directly to the atmosphere. It should be noted that these vented vapors contain only small amounts of hydrocarbon, and that the adsorber 31 serves to remove these small amounts of hydrocarbon when vapors pass therethrough.

Figure 2:
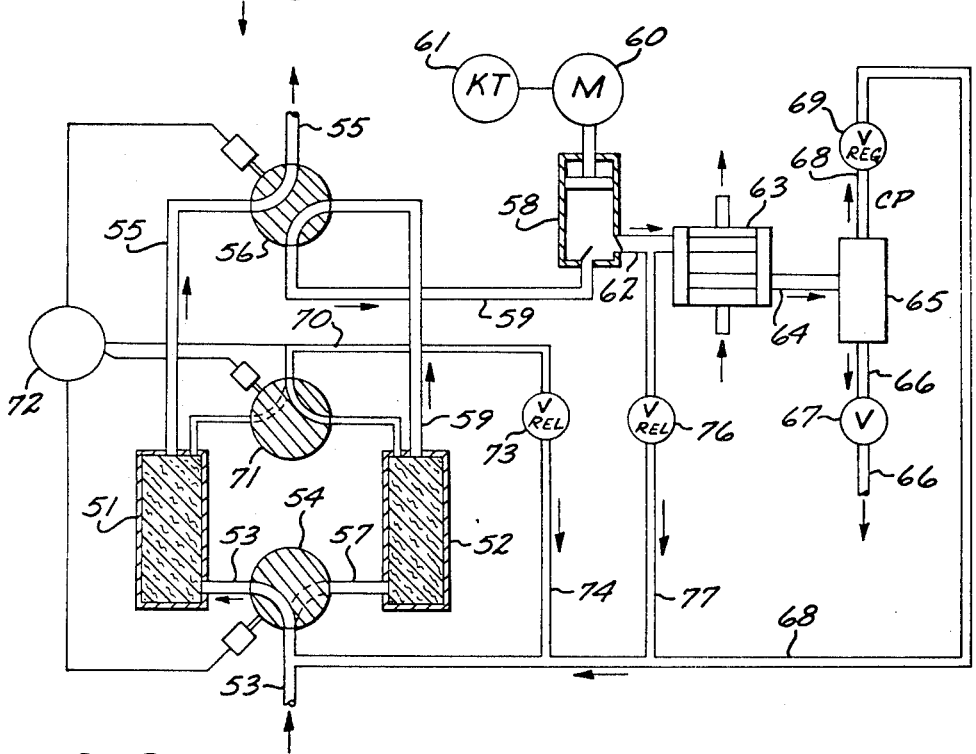
FIG. 2 is a diagrammatic view of yet another embodiment of a vapor recovery unit constructed according to the present invention.

Referring to FIG. 2, yet another embodiment includes a first adsorber 51 and second adsorber 52 which are again filled with activated charcoal, or any other suitable adsorbent material which will let air pass through but which will adsorb substantially all hydrocarbons from vapors passing therethrough. Vapors collected from vehicle fueling operations (by apparatus not shown) enter the first adsorber 51 via a conduit 53 containing a three-way solenoid operated valve 54 positioned to pass the vapors to the first adsorber wherein the hydrocarbons are substantially all adsorbed. Air which contains only very small amounts of hydrocarbons leaves the adsorber 51 via a vent conduit 55 across a three-way solenoid operated valve 56 to be vented to the atmosphere.

Concurrently with the above described operation, the said three-way solenoid operated valve 54 keeps the inlet to the second adsorber 52 closed so that the adsorber 52 can be evacuated by the compressor 58, the suction of which is connected to the said adsorber 52 by a conduit 59. The compressor 58 is driven by a motor 60, which may be started and stopped at predetermined times by a conventional clock timer 61. Vapors extracted from the second adsorber 52 are discharged, at a higher pressure, via a conduit 62 to a condenser 63 wherein the hydrocarbons are condensed. Condensate and uncondensed vapors flow via a conduit 64 to a separator tank 65. Liquid condensate leaves separator tank 65 via a conduit 66 containing a float valve 67, which permits only liquid to pass therethrough, to return the recovered hydrocarbon to a storage (not shown). Uncondensed vapors leave the separator 65 via a conduit 68 containing a pressure regulating valve 69 which is set to throttle the vapor discharge therethrough to maintain a predetermined pressure in the separator 65 and the vapor condenser 63, said higher pressure and the lower temperature in the condenser 63 effecting the condensation of hydrocarbons necessary for the recovery thereof. Vapors flowing through conduit 68 join with the collected vapors entering the active adsorber 51 via conduit 53 and are thus recycled through said first adsorber 51.

Conduit 74 contains a safety relief valve 73 which is set to protect that portion of the system which may become enclosed between the three-way solenoid operated valve 54 and compressor 58 from being overpressured. Conduit 77 contains a safety relief valve 76 which is set to protect that portion of the system which may become enclosed between compressor 58, float valve 67 and pressure regulating valve 69 from being overpressured. Any discharge across either of said safety relief valves 73 or 76 joins the vapors which are recycled through the active adsorber 51.

When the evacuation of the second or inactive adsorber 52 lowers the pressure therein to a predetermined value, a pressure sensitive switch 72, which is connected thereto by a pressure conduit 70 containing a three-way solenoid operated valve 71, energizes or de-energizes the solenoid operated valves 54, 56 and 71 reversing their positions to functionally interchange the adsorbers 51 and 52 so that adsorber 52 becomes the active adsorber and adsorber 51 is the inactive adsorber being regenerated. This reversal also connects the pressure sensitive switch 72 to adsorber 51 so that, when the pressure therein falls activating pressure of said pressure sensitive switch 72, the reversal will again occur. This reversal also switches any flow across safety relief valve 73 or safety relief valve 76. This automatically controlled reversal provides a continuously operating adsorber which is concurrently being continuously regenerated.

Figure 3:
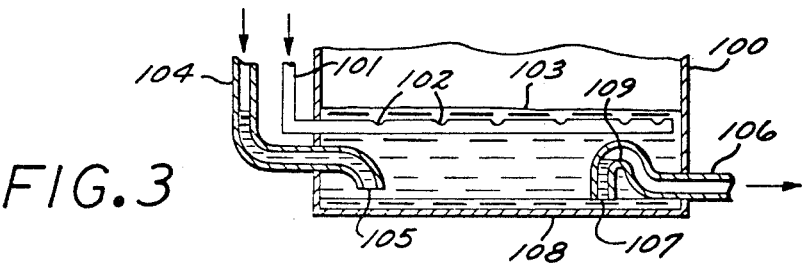
FIG. 3 is a diagrammatical sectional view of the lower portion of the vapor surge tank shown in FIG. 1 showing the inlet and outlet thereof submerged in recovered hydrocarbon liquid, which is an embodiment of this invention.

Referring to FIG. 3, collected vapors enter a surge tank 100 via a conduit 101 which has outlet ports 102 submerged below liquid level 103. Recovered liquid hydrocarbon, which may contain water condensate, enters surge tank 100 via recovered liquid inlet 104. The submergence of outlet 105 below the liquid in tank 100 provides for adsorption of any vapors issuing therefrom in said liquid. Recovered liquid hydrocarbon, which may contain some water, leaves surge tank 100 via a conduit 106 to storage (not shown). The inlet 107 to said conduit 106 is located close to the bottom 108 of surge tank 100 to provide for removal of water which, being more dense than the recovered hydrocarbons in surge tank 100, will collect at the bottom thereof. The weir 109 near the inlet of conduit 106 maintains a level of recovered liquid hydrocarbon in surge tank 100.

Figure 4:
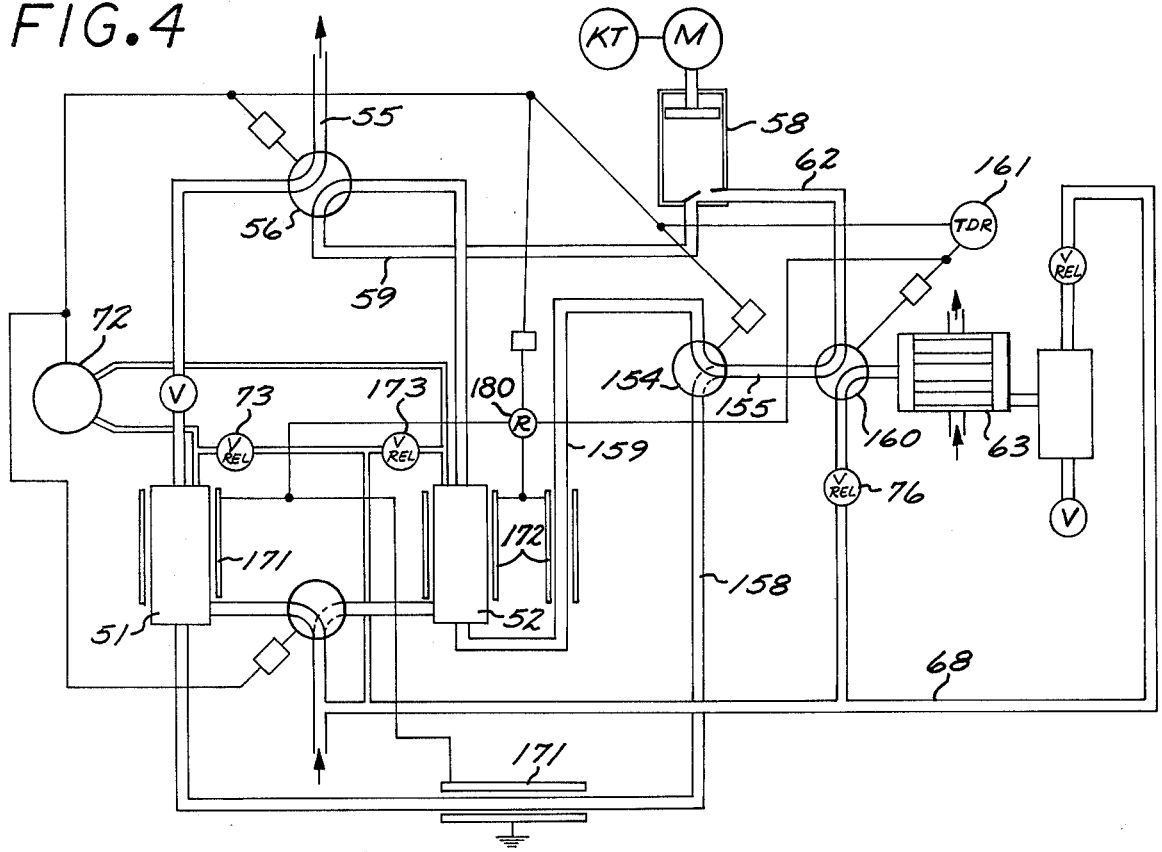
FIG. 4 is a diagrammatic view of a further embodiment of the vapor recovery system constructed according to the present invention.
Figure 5:
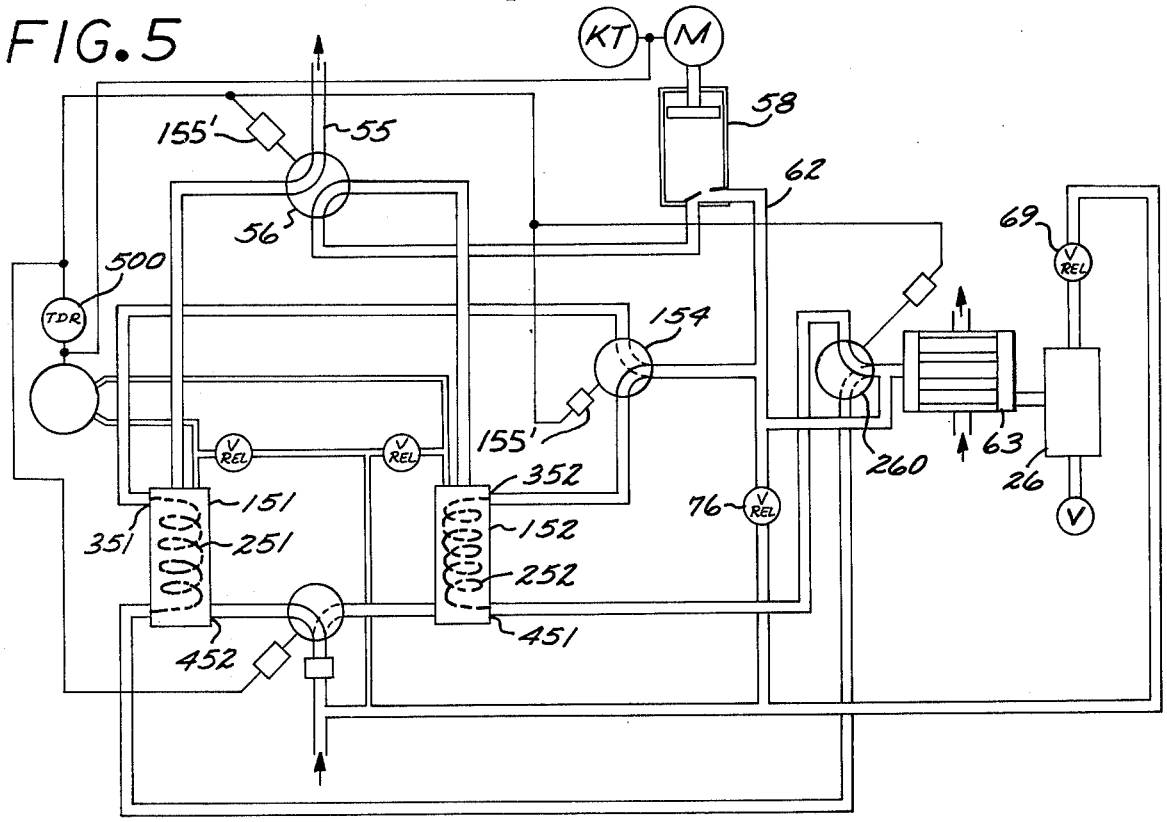
FIG. 5 is a diagrammatic view of yet another embodiment of the vapor recovery system constructed according to the present invention.
Figure 8:
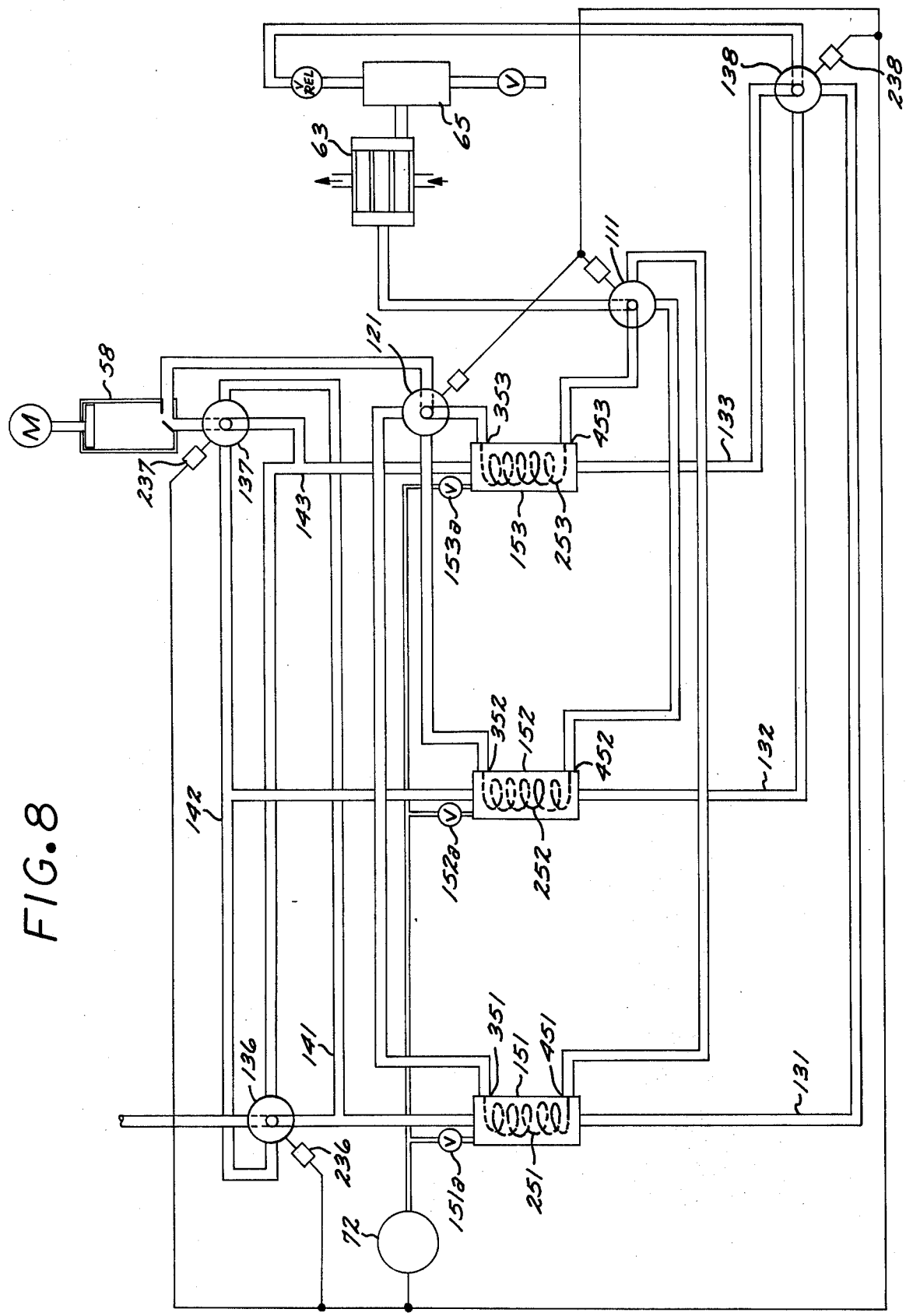
FIG. 8 is a diagrammatic view of yet a further embodiment of the vapor recovery system constructed according to the present invention.

Further embodiments of the present invention, including recirculation means for recirculating the outlet gases of compressor 58 are shown in FIGS. 4, 5 and 8. More specifically, FIG. 4 illustrates one embodiment incorporating the features of the embodiment illustrated in FIG. 2 including a further modification wherein the compressor 58 output gases are periodically recirculated through either adsorber 51 or 52 as selected by the position of a two-way solenoid operated diverter valve 154 acting in unison with valve 54. Valve 154 receives at the input thereof the output end of a conduit 155 where the input end of the conduit 155 is connected to one terminal of a two position four port solenoid operated valve 160 connecting in one position the conduit 55 to the compressor 58 outlet across conduit 62 and in the other position connecting the compressor outlet to the input of condenser 63. The other input port of valve 160 connects across the relief valve 76 to the return conduit 68, to be connected in complement either with the condenser 63 inlet or the valve 154 inlet. The operation of valve 160 is controlled by a conventional time delay relay (TDR) 161, such as the relay manufactured and sold by the Agastat Division of Elastic Stop Nut Corporation of America, designed as relay model series 2400, the relay being initiated by the switching transient of the pressure sensitive switch 72 to articulate valve 160 between the alternative connections set forth above. Generally, such time delay relays are adjustable in the time increment and a time increment can be selected to accommodate the thermal mass of the condenser. Accordingly, the alternating switching transient of the pressure sensitive switch 72 initiates the selected time increment through the time delay relay 161 during which the output gases of compressor 58 are conducted down to valve 154, to be conducted to either the adsorber 51 or 52 according to the position thereof which also is selected by the switch 72. At the completion of the time interval produced by the time delay relay 161 valve 160 is reoriented to connect the output of compressor 58 to the input of the condenser 63. It is to be noted that in this instance the pressure signal controlling the pressure switch 72 is picked off both from the input of relief valve 73 and from the newly added relief valve 173. The particular arrangement of two relief valves across the respective adsorbers 51 and 52 is an alternative configuration replacing the two-position solenoid actuated valve 71. The output ports of valve 154 are connected across corresponding conduits 158 and 159 to the respective adsorbers 51 and 52. To further add heat to the pre-regeneration cycle so formed, adsorbers 51 and 52 and conduits 158 and 159 include associated conventional electrical heating blankets 171 and 172 disposed in parallel circuits to ground from the output side of the relay 161 across a two-position relay 180 which is driven in phase with valve 154. Thus each time the relay 161 is energized to recirculate the compressor output gases through a selected adsorber the heating blankets 171 and 172 are energized. The remainder of this embodiment is both functionally and structurally similar to the embodiment shown in FIG. 2 wherein the conduction of hydrocarbons is directed alternatively to the adsorber 51 and 52 by the valve 54. Valve 54, when conducting to adsorber 51, maintains the input conduit to adsorber 52 closed where the output conduit 59 is routed through valve 56 to the compressor 58. In a similar manner, the vapors extracted from adsorber 52 are compressed by the compressor and after the time interval set by the time delay relay 161 are routed across the condenser 63 to the separator tank 65. Upon reaching a desired recovery level, i.e. a desired level of vacuum, the pressure switch 72 is tripped and the time delay relay 161 is initiated to begin the alternative cycle. It is to be noted that in the process of regeneration, i.e. while the selected adsorber is evacuated by compressor 58, the heat increment added by this preregeneration cycle is effectively lost through the process of more complete evaporation of the hydrocarbon condensate in the adsorber. Thus by the time a vacuum level is reached sufficient to trip switch 72 the adsorber is cooled down sufficiently to effect condensation on the surfaces thereof. It is therefore contemplated that the pressure levels tripping the switch 72 and the selection of the time increment of relay 161 be set to accommodate the particular heat and pressure characteristics of the embodiment as practiced.

A further alternative to the embodiment shown in FIGS. 2 and 4 is the embodiment illustrated in FIG. 5. In this embodiment, similar to the embodiment of FIG. 4, valve 154 is controlled by a solenoid 155 in unison with valves 54 and 56,, the outlet to valve 154 being connected to the output port of compressor 58. The compressor 58 is connected across relief valve 76 to conduit 68 to prevent overpressure therein. Valve 154 articulates between two output ports to alternatively connect to respective heating conduit input ports on the two adsorbers. In this embodiment, the adsorbers shown as 51 and 52 in FIGS. 2 and 4 are replaced by modified adsorbers 151 and 152 including corresponding heating coils 251 and 252 disposed on the interior thereof and connected between respective input ports 351 and 352 and output ports 451 and 452 communicating to the exterior thereof. Ports 351 and 352 are connected to the alternate output ports of valve 154 while ports 451 and 452 connect to a two position solenoid actuated return valve 260, which at the common output port connects to condenser 63. Valve 260 is articulated in common again with the articulation of valves 56, 54 and 154 to selectively communicate across either coil 251 or 252 with the compressor 58. Thus either adsorber 151 or 152 is being heated prior to the regeneration cycle. The remainder of the adsorbing system is then configured in a way similar to the construction shown in FIG. 4.

In order to improve the operation of the adsorbers, particularly as utilized in the embodiment shown in FIG. 4, a further improvement thereof is made as illustrated in FIGS. 6 and 7. More particularly, in FIG. 6 the adsorber 51 is shown to include a casing 362 formed in the manner of a cylinder closed at one end and including on the interior thereof a plurality of transverse mounting rings 363. Supported on each mounting ring 363 is a perforated plate 364 including a peripheral edge 355 conformed to mate with the interior circumference of the corresponding mounting ring 363. In order to assure an effective path of thermal conduction from the exterior of cylinder 362 to the interior circumference of ring 363 and thereacross to the mounting plate 364, the mating surfaces between ring 363 and the edge 355 are tapered in a receiving arrangement. Furthermore, the radial dimensions of the respective mounting plates 364 and corresponding rings 363 are progressed along a conical taper having a central axis along the vertical axis of the cylinder 362. Thus the mounting plates can be installed in progression by passing the mounting plate immediately below to facilitate assembly. Disposed on each top surface of mounting plate 364 is a layer of activated charcoal 356, such layer terminating at a dimension below the lower dimension of the adjacent upper mounting plate to form a cylindrical cavity 360 therebetween. This particular feature allows for redistribution of the gases and prevent the common problem of channeling which frequently occurs in adsorbers of this kind. Proximate the lower side of the lowest mounting plate 364 there is an inlet port 359 voiding into the cavity 360 formed between the bottom surface of casing 362 and the lowermost mounting plate 364. In this manner the localized high pressure flow point is avoided since the pressure within cavity 360 tends to equalize and a uniform flow is therefore generated across the adjacent layer of activated charcoal 356.

From the above, note that the embodiment shown in FIG. 5 permits heating during the entire cycle. At the conclusion of stripping an adsorber 151 (or 152), it is hot due to the continuous heating during stripping.

Accordingly, the time delay relay 500 is included in the output circuit from the pressure sensitive switch 72. The output from the pressure sensitive switch 72 stalls the time delay relay 500 and simultaneously stops the compressor 58. During the timing interval regulated by the time delay relay the newly evacuated adsorber cools sufficiently to be put in service as an adsorber. When the timing relay times out, it reverses the solenoid valves 56, 154, 54 and 260 and starts the compressor motor thereby reversing the adsorber operations. Because the time required to strip an adsorber is brief, the time delay interval for cooling can be substantial. The total time for stripping and cooling is that time which the active adsorber can remain in service without becoming completely filled, or saturated with hydrocarbons.

FIG. 9 illustrates another configuration for providing a pressure distribution cavity in the adsorbent bed. The ring 701 has screens 702 and 703 attached respectively to the upper and lower edges. The assembled ring and screens are supported on the adsorbent below and supported the adsorbent above. The annular gasket 704 fits snugly against the adsorber shell 700 so that any upward vapor flow is directed into the open redistribution area between the screens. Several of these devices can be connected in series in the adsorber spaced at suitable intervals.

In the alternative, the embodiment of an adsorber shown in FIG. 7 can be utilized for the adsorbers 51 and 52. More particularly, the central cavity of the adsorber is provided with a plurality of turb plates 370 partly extending horizontally across the cylindrical casing 362 in opposing interspaced stagger to provide a maximum length of conduction between the inlet port 359 and the output port 371.

The adsorbers shown in FIGS. 6, 7 and 9 are each closed by a cover 365, such cover having integrally attached thereto a relief valve shown as the relief valve 76 associated with the adsorber 51.

A further embodiment particularly adapted for extended vapor adsorption and recovery is shown in FIG. 8. This embodiment incorporates the features of the embodiment shown in FIG. 5 in combination with a third adsorber 153, such combination accommodating, by means further described below, the cooling down of an adsorber prior to the adsorption cycle thereof. More particularly, adsorbers 151, 152 and 153 each include corresponding internally disposed heating coils 251, 252 and 253 connected to communicate with the exterior of the respective adsorbers between input ports 351, 352 and 353 and the output ports 451, 452 and 453. Adsorbers 151, 152 and 153 are connected by associated T conduits 141, 142 and 143 to exhaust both to a three position selector valve 136 and a three position selector valve 137. The common port of valve 137 connects to the input of compressor 58 and the common port of valve 136 vents to atmosphere.

Valves 136 and 137 are stepped between their alternative modes of connection by associated stepping relays 236 and 237 in a fixed phase relationship where the adsorbers are sequentially exhausted to atmosphere, connected to the compressor input or closed off at the exhaust port. The hydrocarbon input to the adsorbers is similarly selected by a selector valve 138 driven by a stepping relay 238 in phase with valve 136 to select alternative supply conduits 131, 132 and 133 to adsorbers 151, 152 and 153. In this manner the hydrocarbon gases developed during fueling are conducted through one selected adsorber, such path being illustrated as occurring through adsorber 151, while a second adsorber, i.e., adsorber 153 in the Figure, is concurrently connected to compressor 58. The third adsorber, i.e. adsorber 152, is closed off in this selected position to cool off. Once adsorber 153 is evacuated to a particular level of vacuum and is therefore regenerated, the pressure responsive switch 72 is actuated across an associated check valve 153(a), or check valves 151(a) and 152(a) associated with adsorbers 151 and 152, respectively, to advance the stepping sequence by one stepping increment where adsorber 151 is connected to the compressor, adsorber 153 is in the cooling cycle and adsorber 152 is connected to collect the gaseous hydrocarbons. Concurrent with such stepping sequence the coil of the adsorber selected for regeneration is connected in series between the output of compressor 58 and the input of condenser 63. Valve 121 alternatively connects across selected conduits 122, 123 and 124 to the input ports 351, 352 or 353 while valve 111 connects across selected ones of conduits 112, 113 and 114 to the outlet ports 451, 452 and 453. Valves 121 and 111 are sequenced in phase with valve 137 to provide the appropriate routing of the compressor exhaust gases.

In this manner, any heat balance level of the system can be accommodated and switchover between adsorbers is made according to the pressure level therein in the manner described above as facilitated by check valves 151(a), 152(a) and 153(a).

An alternative manner of connecting the pressure sensitive switch 72 input to the adsorber being evacuated (not shown) is to connect a three position indexing valve similar in action and phasing to valve 121, so that the inlet ports of said valve are respectively connected to adsorbers 251, 252 and 253 and the outlet port of said valve is connected to the pressure sensitive switch 72, said valve being operated concurrently with valve 121 by the same means.

In operation, the hydrocarbon vapors associated with any fueling operation are connected to a compressor 19 or 58 where they are compressed, thereby raising their temperature. The output of the compressor is fed to a conventional condenser which drops the temperature of the pressurized vapors, thereby effecting the condensation thereof. The products of condensation of the condenser are then fed to a conventional separator which, upon registering a predetermined volume of liquid, is drained, while connecting the separated vapor to an adsorber. The output of the adsorber is selectively switched, either to vent to atmosphere or to recirculate through the compressor and condenser. In a first embodiment of this invention the adsorber is recirculated during the times when no vapor evacuation takes place, thereby being regenerated during the times when the system is not in use. In a second embodiment two adsorbers are alternately connected to the compressor whereby one is connected to adsorb the output of the separator in combination with the input gases while the second one is being regenerated. In the third embodiment an additional adsorber is included in the system to allow for cooling down thereof prior to the adsorption cycle.

Some of the many advantages of the present invention should now be readily apparent. The invention provides means by which an adsorber is alternatively stripped and regenerated in combination with apparatus for separating out condensate. Thus continuous use of the system is assured, there being a regenerated adsorber constantly available for use. Recycling the uncondensed vapors from the stripping and regeneration process through the adsorber receiving the input vapors prevents emission to the atmosphere of vapors associated with such stripping operations. Thus a highly efficient means for recovery of hydrocarbons from a mixture of hydrocarbon vapors and air is assured.

Obviously, many modifications and variations of the present invention may be made with regard to the foregoing detailed description without departing from the spirit of the invention.

I claim:

1. Apparatus for removing vapors from a mixture of vapor and air, comprising:
   gas-receiving means for conducting said mixture;
   first and second adsorption means adapted to receive said mixture from said gas-receiving means for adsorbing and removing said vapors therefrom;
   condensation means for condensing said vapors including a compressor and a condenser connected to said condenser at the input thereof and having means for condensing said gas by conducting away heat;
   separation means connected to said condensation means for receiving the output thereof and separating the respective liquid and gas constituents thereof;
   switching means connected to the input and output of said first and second adsorption means for alternatively connecting a selected one of said outputs to the input of said condensation means while concurrently connecting the input of the other one to said gas-receiving means and closing the input of said selected one of said first and second adsorption means and including an electrical pressure responsive switch operatively connected to the selected one of said first and second adsorption means, first valve means connected to said switch for venting the output of the selected one of said first and second adsorption means and for conducting the output of the other one to the input of said compressor when said switch registers a pressure below a predetermined pressure in said selected one of said adsorption means, and second valve means connected to said switch for concurrently connecting the input of the selected one of said adsorption means to said gas-receiving means; and
   connection means connected to said separation means for conducting the gas constituent thereof to said gas-receiving means.

2. Apparatus according to claim 1 that includes:
   a pressure relief valve and third valve means connected to said electrical switch and connecting the selected one of said first and second adsorption means to the inlet of said pressure relief valve and to the pressure input of said electrical pressure responsive switch.

3. Apparatus for removing vapors from a mixture of vapor and air comprising:
   gas-receiving means for conducting said mixture;
   adsorption means operatively connected to receive said mixture from said gas-receiving means including a plurality of adsorbers disposed to collect on the interior thereof said vapor;
   condensation means for condensing said vapors, including a compressor operatively connected to a condenser at the output thereof, said condenser condensing said gas by conducting away heat;
   selection means including a pressure responsive switch connected between said condensation means and said adsorption means for connecting selected ones of said adsorbers to said gas-receiving means and selected other of said adsorbers to said condensation means whereby said pressure responsive switch is connected to be activated by the pressure within the selected others of said adsorbers;
   recirculation means selectively connected to said adsorption means, said condenser means and said selection means for selectively recirculating the outlet gases from said compressor means to the selected others of said adsorbers including first selector valve having a common input port operatively connected to the output of said compressor and having two outlet ports alternatively communicating with the selected ones or others of said adsorbers, a second selector valve having a common output port connected to the input of said condenser and having two input ports alternatively communicating with the selected ones or others of said adsorbers, and a recirculation valve connected to said compressor outlet for alternatively connecting to the common input port of said first selector valve or to the input of said condenser, and timing means for switching said recirculation valve to connect to said condensor a predetermind time interval after the switching thereof to said first selector valve wherein said pressure responsive switch actuates said first and second selector valves between the alternating states thereof.

4. Apparatus according to claim 1 wherein:
said adsorbers include a tubular housing, perforated discs mounted in progressive order within the interior of said housing in transverse alignment relative the longitudinal axis thereof, activated charcoal layers supported on respective one surfaces of said discs, and end closure means formed to sealably close the ends of said housing including port means for passing said mixture through the interior thereof.

5. Apparatus according to claim 4 further comprising:
electrical heating means connected to be energized concurrent with the connection of said recirculation valve to said first selector valve for heating the selected ones or others of said adsorbers according to the position of said first selector valve.

6. Apparatus according to claim 3 wherein:
said absorbers include heating coils disposed within the interior thereof and connected between said first and second selector valves.

7. Apparatus for removing vapors from a mixture of vapor and air, comprising:
gas-receiving means for conducting said mixture;
adsorption means operatively connected to receive said mixture from said gas-receiving means including a plurality of adsorbers disposed to collect on the interior thereof said vapor;
condensation means for condensing said vapors, including a compressor operatively connected to a condenser at the output thereof, said condender condensing said gas by conducting away heat;
selection means including a pressure responsive switch connected to be actuated by the pressure within the selected second ones of said adsorbers for actuating said first and second selector valves in progression to the selecting states thereof connected between said condensation means and said adsorption means for connecting selected first ones of said adsorbers to said gas-receiving means, selected second ones of said adsorbers to said condensation means and for closing selected third ones of said adsorbers; recirculation means including a first selector valve having a common input port operatively connected to the output of said compressor and having three outlet ports alternatively communicating with the selected first ones, second ones or third ones of said adsorbers, a second selector valve having a common output port connected to the input of said condenser and having three input ports alternatively communicating in common with said first selector valve with the selected first ones, second ones or third ones of said absorbers, a recirculation valve connected to said compressor outlet for alternatively connecting to the common input of said condenser, and timing means for switching said recirculation valve to connect to said condenser a predetermined time interval after the switching thereof to said first selector valve wherein said recirculation means is selectively connected to said adsorption means, said condenser means and said selection means for selectively recirculating the outlet gases from said compressor means to the selected second ones of said adsorbers; and timing means connected to said selection means and said recirculation means of producing a predetermined time interval initiated by said selection means during which said recirculation means are connected to the selected second ones of said adsorbers.

* * * * *